(12) United States Patent
Ibaraki

(10) Patent No.: US 7,705,563 B2
(45) Date of Patent: Apr. 27, 2010

(54) CHARGING CONTROL SEMICONDUCTOR INTEGRATED CIRCUIT AND SECONDARY BATTERY CHARGING APPARATUS USING THE SAME

(75) Inventor: Tohru Ibaraki, Hyogo-ken (JP)

(73) Assignee: Ricoh Company, Ltd., Tokyo (JP)

( * ) Notice: Subject to any disclaimer, the term of this patent is extended or adjusted under 35 U.S.C. 154(b) by 542 days.

(21) Appl. No.: 11/707,449

(22) Filed: Feb. 16, 2007

(65) Prior Publication Data

US 2007/0216357 A1    Sep. 20, 2007

(30) Foreign Application Priority Data

Feb. 17, 2006    (JP)    ............... 2006-040867

(51) Int. Cl.
  *H02J 7/00*    (2006.01)
(52) U.S. Cl. .................................... 320/128
(58) Field of Classification Search ............... 320/128, 320/134, 136, 158, 159
  See application file for complete search history.

(56) References Cited

U.S. PATENT DOCUMENTS 6,828,764 B2 * 12/2004 Takimoto et al. ............ 323/284
6,836,095 B2 * 12/2004 Fogg ........................... 320/128
2007/0001646 A1 * 1/2007 Kojima ....................... 320/128

FOREIGN PATENT DOCUMENTS

| JP | 2000-182677 | 6/2000 |
|---|---|---|
| JP | 2004-320914 | 11/2004 |
| JP | 2005-50055 | 2/2005 |

* cited by examiner

*Primary Examiner*—Patrick J Assouad
*Assistant Examiner*—M'Baye Diao
(74) *Attorney, Agent, or Firm*—Cooper & Dunham LLP

(57) ABSTRACT

A charging control semiconductor integrated circuit used in a charging apparatus for a secondary battery includes first and second terminals. The first terminal is configured to output a control signal to a first charging transistor in the charging apparatus. The second terminal is configured to output a control signal to a second charging transistor in the charging apparatus. Further, the first and second charging transistors are separately controlled on the basis of a voltage across the first charging transistor, a voltage across the second charging transistor, and a voltage of the secondary battery.

16 Claims, 12 Drawing Sheets

CHARGING CONTROL SEMICONDUCTOR INTEGRATED CIRCUIT AND SECONDARY BATTERY CHARGING APPARATUS USING THE SAME

TECHNICAL FIELD

The present patent specification relates to a charging semiconductor integrated circuit and a secondary charging apparatus using the circuit, and, more specifically, to a charging semiconductor integrated circuit capable of effectively charging with a plurality of power transistors, and a secondary battery charging apparatus using the circuit.

DISCUSSION OF RELATED ART

In recent years, portable devices, such as cellular phones, that use second batteries as power supplies have been in widespread use. As the second batteries, lithium ion batteries that have lightweight and large capacity are commonly used. Regarding charging of a lithium ion battery, it is necessary to be careful so that a charging voltage is prevented from exceeding a given voltage since an excessively high charging voltage significantly deteriorates battery performance. For this reason, in general, a constant-current constant-voltage charging method is used. In this charging method, in an initial charging stage, a secondary battery is charged at a constant current, and, after the secondary battery reaches a given voltage, the secondary battery is continuously charged at the given voltage. A point at which the charging current gradually decreases and lowers to another given value is regarded as a full charge state, and the charging of the secondary battery is completed.

This method has advantages as follows. First, an increase in the charging current in the initial stage enables quick charging, thus reducing charging time. Further, since the charging of the secondary battery shifts to constant voltage charging after reaching the given voltage, a voltage possibly deteriorating the secondary battery is not applied to the secondary battery. Accordingly, this method is widely used.

FIG. 1 is a circuit diagram illustrating a charging apparatus 100 according to a related art of the present patent specification. The charging apparatus 100 is provide with a charging circuit 110 employing a constant-current constant-voltage charging method.

Referring to FIG. 1, when a voltage of a secondary battery 102 is low, and an output signal Vbat from a battery voltage detecting circuit 117 is not greater than a reference voltage Vr2, an output voltage CV from an operational amplifier circuit 112 is in a high level, so that an NMOS (N-channel metal oxide semiconductor) transistor M112 is turned on.

A charging current detecting circuit 115 converts a voltage dropped in a charging current detecting resistor R101 to a ground reference voltage, and outputs the voltage. An operational amplifier circuit 111 performs constant current charging by using the NMOS transistor M111 to control a collector current i101 of a power transistor Q101 so that an output signal Vi1 from the charging current detecting circuit 115 is equal to a reference voltage Vr1.

When the voltage of the secondary battery 102 rises and an output signal Vbat from the battery voltage detecting circuit 117 reaches a reference voltage Vr2, an output signal CV from the operational amplifier circuit 112 drops. Subsequently, the operational amplifier circuit 112 decreases a collector current i101 of the power transistor Q101 via an NMOS transistor M112, and thereby controls the output signal Vbat from the battery voltage detecting circuit 117 to be equal to a reference voltage Vr2. Thus, the operational amplifier circuit 112 performs constant voltage charging while maintaining the voltage of the secondary battery 102 constant.

When the collector current i101 of the power transistor Q101 is decreased, the output signal Vi1 from the charging current detecting circuit 115 drops below a reference voltage Vr1. Thereby, an output signal CC from the operational amplifier circuit 111 is set to be in a high level, thus turning on the NMOS transistor M111 to be in conduction. Therefore, the function of the constant current charging does not work. In this manner, the constant current charging is automatically switched to the constant voltage charging.

In order to shorten the charging time, a large current value in constant current charging is needed. When the large current value is used, a large size power transistor needs to be used as the power transistor Q101. Depending on a power transistor mounting form, compared with a case in which a single large size power transistor is used, there may be a case in which a device size reduction is achieved by using a plurality of small transistors to distribute charging currents. In particular, in cases such as when the height of a mounting space must be reduced to be low, and when generated power transistor heat is dissipated for radiation, it is advantageous to form a single power transistor by using a plurality of transistors.

FIG. 2 is a circuit diagram illustrating a case in which a plurality of transistors form the power transistor Q101 illustrated in FIG. 1. In FIG. 2, two power transistors Q101a and Q101b are connected in parallel so as to be controlled as a single power transistor.

However, when the power transistors Q101a and Q101b are connected in parallel as illustrated in FIG. 2, variation in transistor causes a difference in collector current between the power transistors Q101a and Q101b. Thus, when transistors in which flowing currents almost reach maximum rated values are used, in constant current charging, the flowing current in one transistor may exceed the maximum rated value. Accordingly, rated values of transistors in use must have tolerances. This causes an enlarged mounting space and an increase in required cost.

Methods for suppressing variation in collector current include, as illustrated in FIG. 3, a method in which resistors R103 and R104 are respectively connected to emitters of the power transistors Q101a and Q101b. To reduce variations in the flowing currents in the power transistors Q101a and Q101b, the resistances of the resistors R103 and R104 need to be increased, and the increased resistances deteriorate efficiency of power supply use.

In the configurations in FIGS. 2 and 3, the collector currents of the power transistors Q101a and Q101b are equal. Thus, power transistors having different rated values cannot be used in combination, for example, in a case in which a rated charging current of one power transistor serving as a main-transistor is 1 A (ampere) and a rated charging current of the other power transistor serving as a sub-transistor is 0.5 A.

BRIEF SUMMARY

At least one exemplary embodiment of the present specification provides a charging control semiconductor integrated circuit for a charging apparatus that performs one of constant current charging and constant voltage charging to charge a secondary battery by supplying charging currents from first and second charging transistors to the secondary battery through first and second charging current detecting resistors respectively corresponding to the first and second charging transistors, the charging control semiconductor integrated circuit controlling operations of the first and second charging transistors. The charging control semiconductor integrated circuit includes first and second terminals. The first terminal is configured to output a control signal to a first charging transistor in the charging apparatus. The second terminal is configured to output a control signal to a second charging transistor in the charging apparatus. Further, the first and second charging transistors are separately controlled on the basis of a voltage across the first charging transistor, a voltage across the second charging transistor, and a voltage of the secondary battery.

Further, at least one exemplary embodiment of the present specification provides a charging apparatus for charging a secondary battery by performing one of constant current charging and constant voltage charging. The charging apparatus includes a first charging transistor, a second charging transistor, a first charging current detecting resistor, a second charging current detecting resistor, and a charging control semiconductor integrated circuit. The first charging transistor is configured to supply a first charging current to the secondary battery. The second charging transistor that is configured to supply a second charging current to the secondary battery. The first charging current detecting resistor is configured to convert the first charging current into a voltage. The second charging current detecting resistor is configured to convert the second charging current into a voltage. The charging control semiconductor integrated circuit includes terminals to output control signals to the first and second charging transistors. The charging control semiconductor integrated circuit separately controls the first and second charging transistors on the basis of a voltage across the first charging current detecting resistor, a voltage across the second charging current detecting resistor, and a voltage of the secondary battery.

BRIEF DESCRIPTION OF THE DRAWINGS

A more complete appreciation of the subject matter of this disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
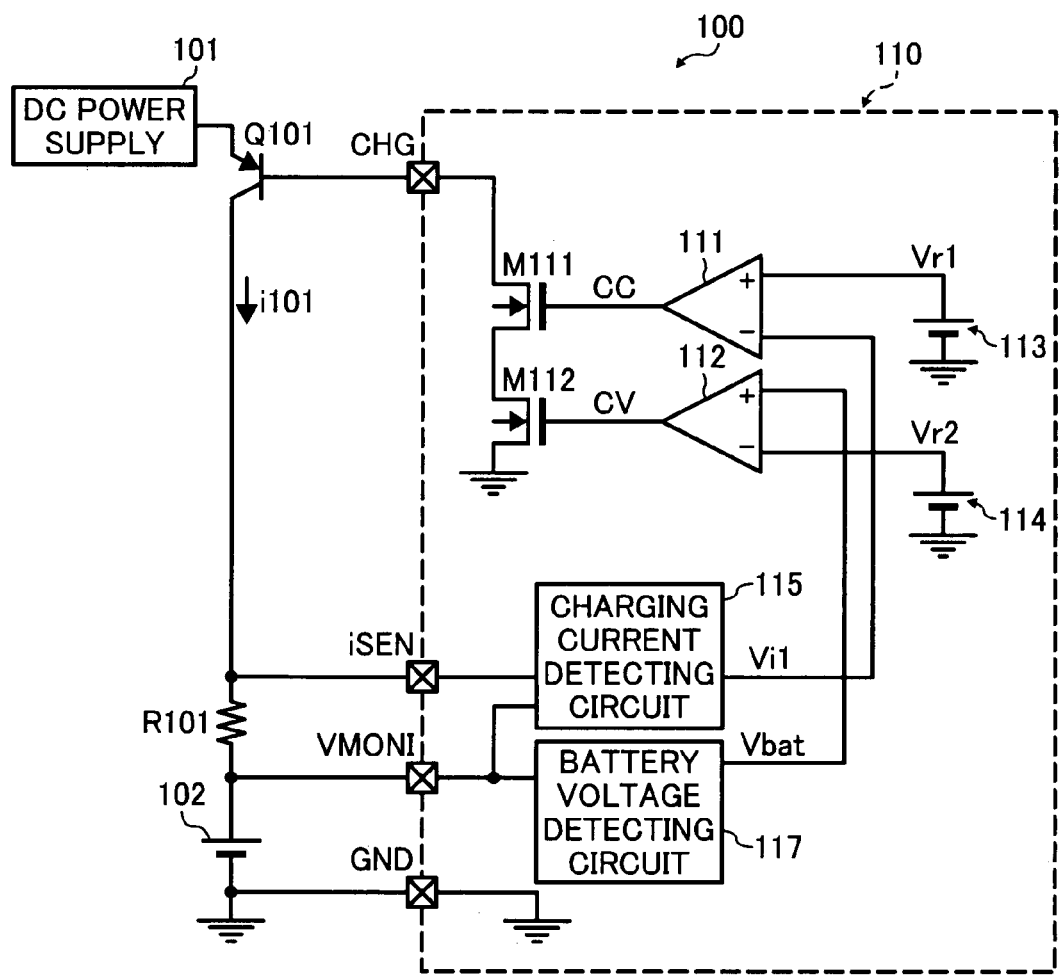
FIG. 1 is a circuit diagram illustrating a charging circuit according to a related art of the present patent specification.
Figure 2:
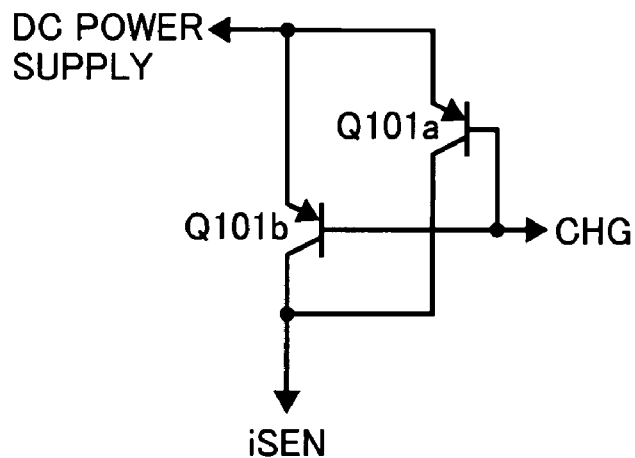
FIG. 2 is a circuit diagram illustrating a case in which a plurality of transistors form one power transistor illustrated in FIG. 1.
Figure 3:
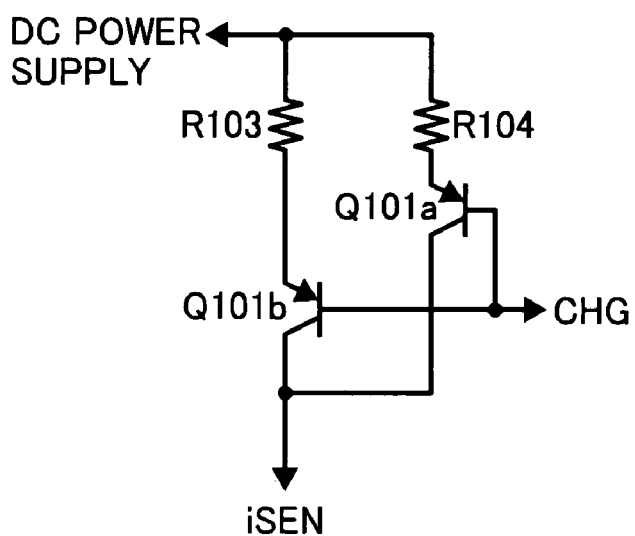
FIG. 3 is a circuit diagram illustrating another case in which a plurality of transistors form one transistor illustrated in FIG. 1.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, exemplary embodiments of the present patent specification are described.

Figure 4:
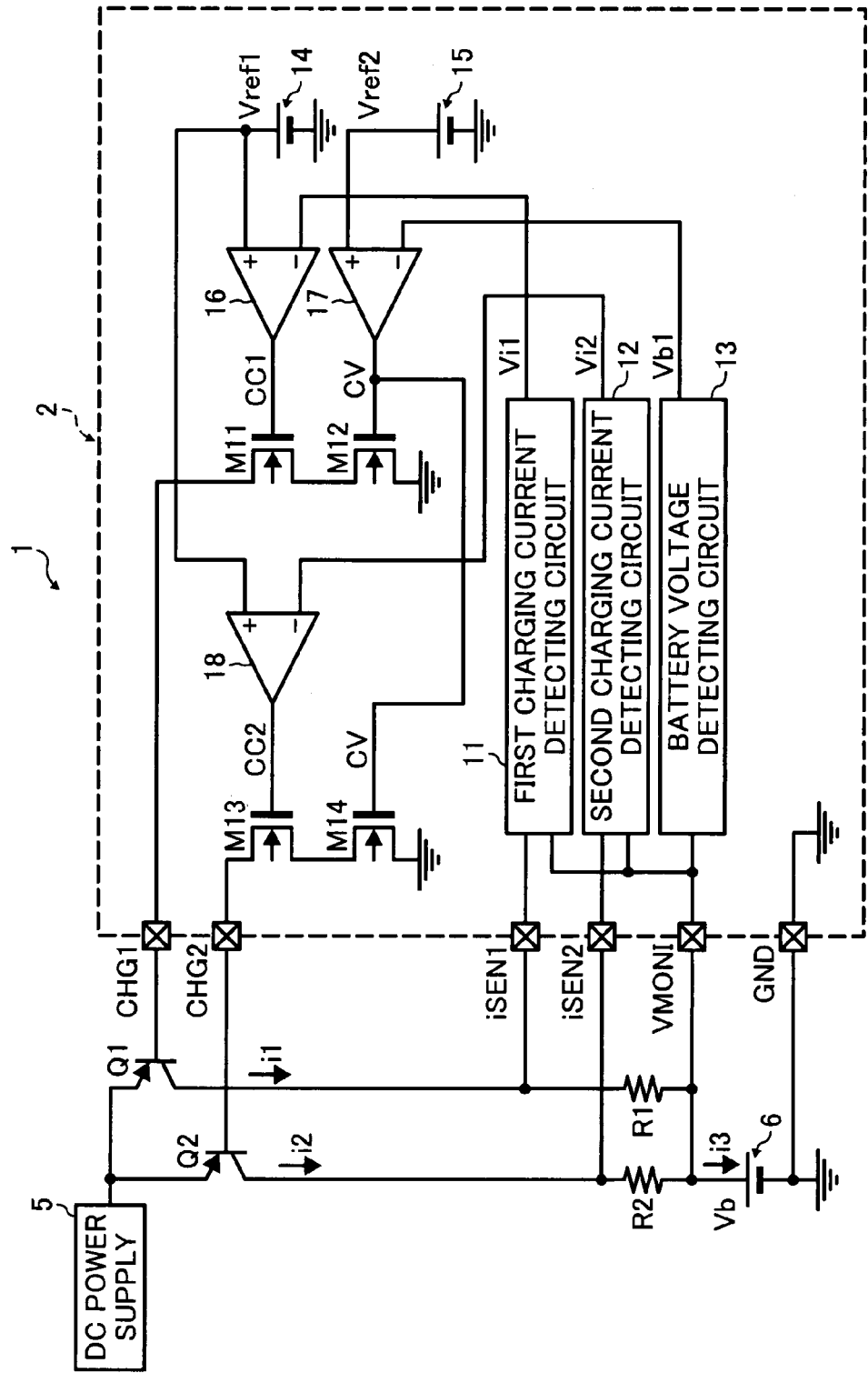
FIG. 4 is a circuit diagram illustrating a secondary battery charging apparatus according to a first exemplary embodiment of the present patent specification.

FIG. 4 is a circuit diagram illustrating a secondary battery charging apparatus 1 according to a first exemplary embodiment of the present patent specification.

In FIG. 4, the charging apparatus 1 uses a DC power supply 5, such as an AC adapter, as a power supply therefor. By performing constant current charging or constant voltage charging, the charging apparatus 1 charges a secondary battery 6 such as a lithium ion battery.

The charging apparatus 1 includes charging power transistors Q1 and Q2, such as PNP transistors, that supply the secondary battery 6 with currents in accordance with signals input to bases of the power transistors Q1 and Q2, a resistor R1 for detecting the value of a first charging current i1 that is supplied from the power transistor Q2 to the secondary battery 6, and a resistor R2 for detecting the value of a second charging current i2 that is supplied from the power transistor Q2 to the secondary battery 6. The charging apparatus 1 also includes a charging control circuit 2 for controlling operations of the power transistors Q1 and Q2 so as to perform constant current charging or constant voltage charging on the secondary battery 6 from information of the first charging current i1 and the second charging current i2 that is obtained from the battery voltage Vb as the voltage of the secondary battery 6 and each of a voltage across the resistor R1 and a voltage across the resistor R2. The secondary battery 6 is supplied with a charging current i3 that is the sum of the first charging current i1 and the second charging current i2.

A charging control circuit 2 is integrated as a single IC (integrated circuit). The charging control circuit 2 has terminals CHG1, CHG2, iSEN1, iSEN2, VMONI, and GND. The terminal GND is grounded. The charging control circuit 2 includes a first charging current detecting circuit 11 for detecting first charging current i1 from the voltage across the resistor R1, a second charging current detecting circuit 12 for detecting second charging current i2 from the voltage across the resistor R2, and a battery voltage detecting circuit 13 for generating and outputting voltage Vb1 that is proportional to the detected battery voltage Vb. The battery voltage detecting circuit 13 may directly output the output battery voltage Vb as voltage Vb1. The charging control circuit 2 includes a first reference voltage generating circuit 14 for generating and outputting given first reference voltage Vref1, a second reference voltage generating circuit 15 for generating and outputting given second reference voltage Vref2, operational amplifiers 16 to 18, and NMOS transistors M11 to M14.

The power transistor Q1 corresponds to a first charging transistor. The power transistor Q2 corresponds to a second charging transistor. The resistor R1 corresponds to a first charging current detecting resistor. The resistor R2 corresponds to a second charging current detecting resistor. The first charging current detecting circuit 11 corresponds to a first charging-current-detecting circuit section. The second charging current detecting circuit 12 corresponds to a second charging-current-detecting circuit section. The battery voltage detecting circuit 13 corresponds to a battery-voltage-detecting circuit section. The first reference voltage generating circuit 14, the second reference voltage generating circuit 15, the operational amplifier circuits 16 and 17, and the NMOS transistors M11 and M12 correspond to a first charging circuit portion. The first reference voltage generating circuit 14, the operational amplifier circuit 18, and the NMOS transistors M13 and M14 correspond to a second charging circuit portion.

The first reference voltage generating circuit 14, the operational amplifier circuit 18, and the NMOS transistor M13 correspond to a second constant current charging control circuit. The second reference voltage generating circuit 15, the operational amplifier circuit 17, and the NMOS transistor M14 correspond to a second constant voltage charging circuit. The operational amplifier circuit 16 corresponds to a first operational amplifier circuit. The NMOS transistor M11 corresponds to a first transistor. The operational amplifier circuit 17 corresponds to a second transistor. The operational amplifier circuit 18 corresponds to a third operational amplifier circuit. The NMOS transistor M13 corresponds to a third transistor. The MOS transistor M14 corresponds to a fourth transistor.

A base of the power transistor Q1 is connected to the terminal CHG1, and the NMOS transistors M11 and M12 are connected in parallel between the terminal CHG1 and the ground. A base of the power transistor Q2 is connected to the terminal CHG2, and the NMOS transistors M13 and M14 are connected in parallel between the terminal CHG2 and the ground. The first reference voltage Vref1 is input to a non-inverting terminal of the operational amplifier circuit 16, and the output signal Vi1 is input from the first charging current detecting circuit 11 to an inverting terminal of the operational amplifier circuit 16. An output terminal of the operational amplifier circuit 16 is connected to a gate of the first charging current detecting circuit 11. The second reference voltage Vref2 is input to a non-inverting terminal of the operational amplifier circuit 17, and the output signal Vb1 is input from the battery voltage detecting circuit 13 to an inverting terminal of the operational amplifier circuit 17. An output terminal of the operational amplifier circuit 17 is connected to gates of the NMOS transistors M12 and M14. The first reference voltage Vref1 is input to a non-inverting terminal of the operational amplifier circuit 18, and the output signal Vi2 is input from the second charging current detecting circuit 12 to an inverting terminal of the operational amplifier circuit 18. An output terminal of the operational amplifier circuit 18 is connected to the gate of the NMOS transistor M13.

Figure 5:
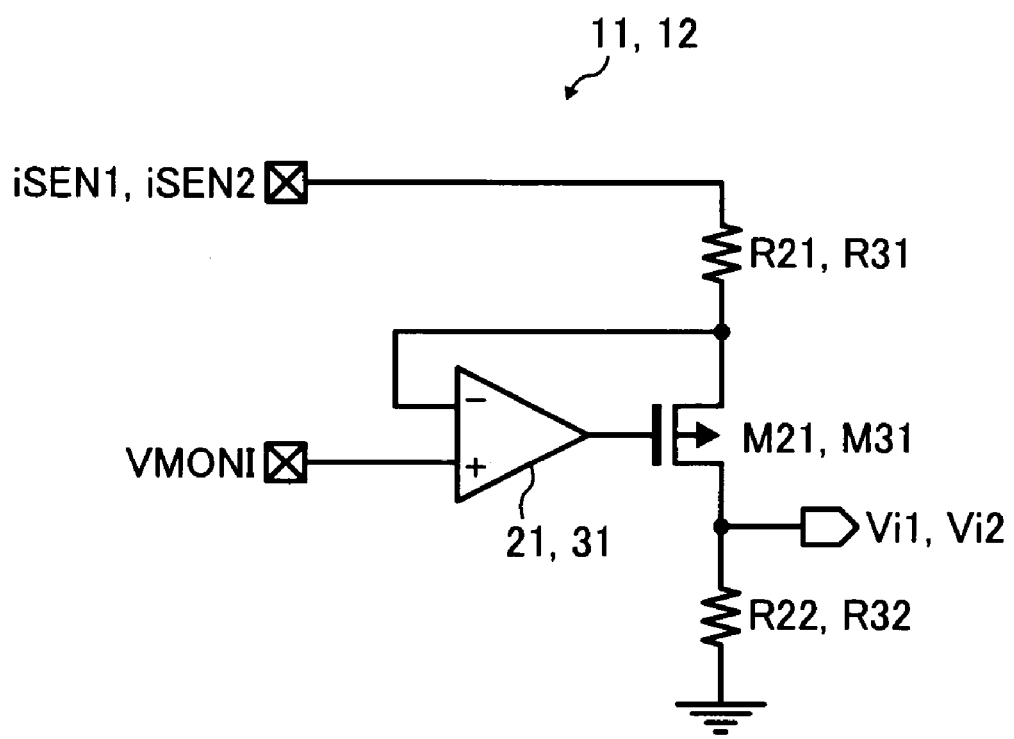
FIG. 5 is a circuit diagram illustrating an example of each of the charging current detecting circuits illustrated in FIG. 4.

FIG. 5 illustrates an example of each of the first charging current detecting circuit 11 and the second charging current detecting circuit 12. The first charging current detecting circuit 11 and the second charging current detecting circuit 12 are identical to each other in circuit configuration. The parenthesized reference numeral indicates the case of the second charging current detecting circuit 12. The first charging current detecting circuit 11 is described below as an example.

In FIG. 5, the first charging current detecting circuit 11 includes an operational amplifier circuit 21, a PMOS (P-channel metal oxide semiconductor) transistor M21, and resistors R21 and R22.

The resistor R21, the PMOS transistor M21, and the resistor R22 are connected in parallel between the terminal iSEN1 and the ground. A gate of the PMOS transistor M21 is connected to an output terminal of the operational amplifier circuit 21. The operational amplifier circuit 21 has a non-inverting terminal connected to the terminal VMONI, and an inverting terminal connected to a junction between the resistor R21 and the PMOS transistor M21. A voltage drop in the resistor R1 connected between the terminals iSEN1 and VMONI is input and amplified in the operational amplifier circuit 21 at an amplification factor determined by a ratio between the resistors R21 and R22. In addition, the signal Vi1 obtained by conversion using the ground voltage as a reference is from a junction between the PMOS transistor M21 and the resistor R22.

When, in this configuration, the battery voltage Vb of the secondary battery 6 is small, and the voltage Vb1 from the battery voltage detecting circuit 13 is less than the second reference voltage Vref2, the output signal CV from the operational amplifier circuit 17 is in a high level, and both the NMOS transistors M12 and M14 are turned on. The operational amplifier circuit 16 controls the first charging current i1 as the collector current of the power transistor Q1 so that the output signal Vi1 from the first charging current detecting circuit 11 is equal to the first reference voltage Vref1. The operational amplifier circuit 18 controls second charging current i2 as the collector current of the power transistor Q2 so that the output signal Vi2 from the second charging current detecting circuit 12 is equal to the first reference voltage Vref1. In other words, the secondary battery 6 is charged in constant current charging using the collector currents i1 and i2 of the power transistors Q1 and Q2.

When the voltage Vb1 from the battery voltage detecting circuit 13 is not less than the second reference voltage Vref2, the output signal CV from the operational amplifier circuit 17 lowers. Accordingly, the operational amplifier circuit 17 comes to control the power transistors Q1 and Q2 with the NMOS transistors M12 and M14 so that the voltage Vb1 from the battery voltage detecting circuit 13 is equal to the second reference voltage Vref2. After that, constant voltage charging comes to be performed. In a constant voltage charging state, the collector currents i1 and i2 of the power transistors Q1 and Q2 decrease than those in constant current charging, so that both the signals Vi1 and Vi2 from the first and second charging current detecting circuits 11 and 12 decrease than first reference voltage Vref1. For the reason, output signals CC1 and CC2 from the operational amplifier circuits 16 and 18 are in their high levels, thus turning on both the NMOS transistors M11 and M13. This finishes the constant current charging, and constant voltage charging using collector currents i1 and i2 of the power transistors Q1 and Q2 is performed.

Figure 6A:
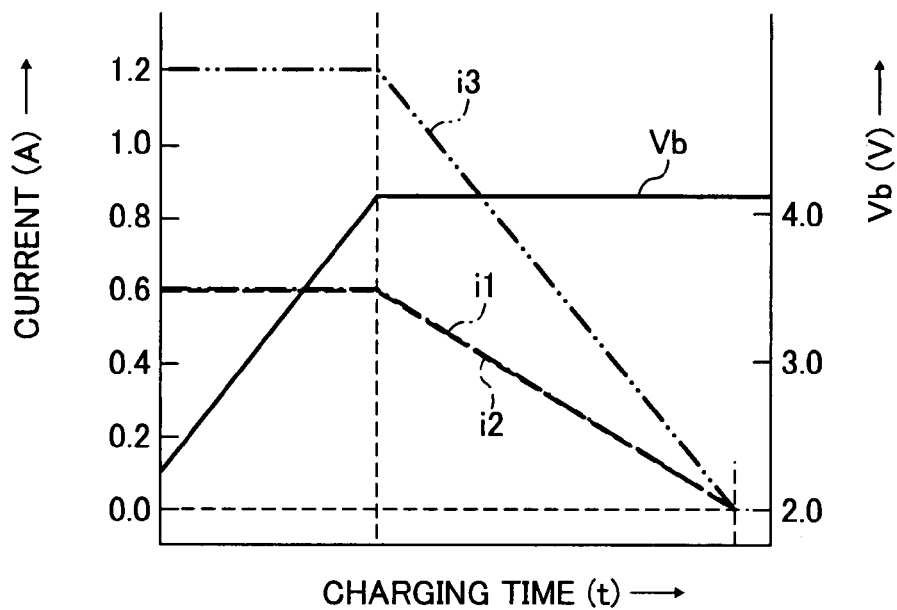
FIGS. 6A and 6B are graphs illustrating relationships between battery voltage Vb and charging current i3 in the charging apparatus illustrated in FIG. 4.
Figure 6B:
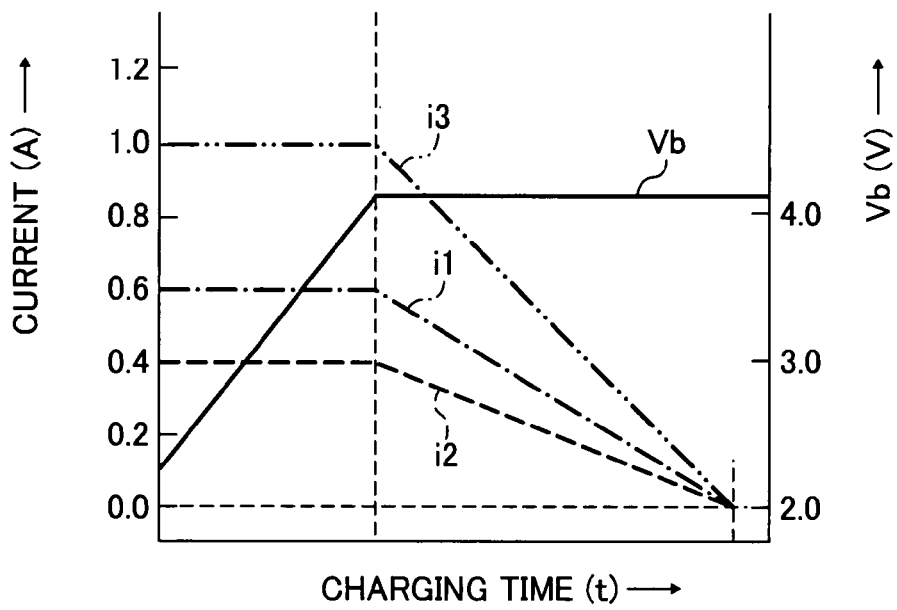

FIGS. 6A and 6B are graphs illustrating examples of relationships between battery voltage Vb and charging current i3 in the charging apparatus 1 illustrated in FIG. 1. When battery voltage Vb is less than 4.2 V, constant current charging is performed and battery voltage Vb rises. When battery voltage Vb is not less than 4.2 V, the charging apparatus 1 changes to constant voltage charging and charging current i3 decreases. FIG. 6A illustrates a case in which the resistors R1 and R2 are equal in value, identical circuits are used as the first and second charging current detecting circuit 11 and 12, and collector currents i1 and i2 of the power transistors Q1 and Q2 are set to be identical.

In the case of FIG. 6A, charging current i3 in constant current charging is 1.2 A (amperes), and charging current i3 is the sum of collector currents i1 and i2 of 0.6 A of the power transistors Q1 and Q2. In addition, charging current i3 also in constant voltage charging is equally divided in the ratio of collector currents i1 and i2 of the power transistors Q1 and Q2.

FIG. 6B illustrates a case in which collector current i2 of the power transistor Q2 is set to be less than collector current of the power transistor Q1. In the case of FIG. 6B, the resistance of the resistor R2 is set to be 1.5 times that of the resistor R1.

By increasing the resistance of the resistor R1 than that of the resistor R1, the collector current i2 of the power transistor Q1 can be decreased. In constant current charging, charging current i3 is 1 A, collector current i1 of the power transistor Q1 is 0.6 A, and collector current i2 of the power transistor Q2 is 0.4 A. In addition, in charging current i3 in constant voltage charging, collector current i1 of the power transistor Q1 and collector current i2 of the power transistor Q2 are in the same ratio.

As described above, in the charging apparatus 1 according to the first exemplary embodiment, since control circuits that separately control the power transistors Q1 and Q2 are provided, a charging current supplied from each power transistor can accurately be set, and a transistor almost having a rated value can become used. As a result, size reduction of an apparatus that performs large current charging can be achieved. Even if power transistors having different rated values are used, control that stratifies specifications of each power transistor can be performed. Accordingly, selection of power transistors can be extended. In addition, by only using a charging control circuit, which serves as a master circuit, constant-current-constant-voltage charging by a single transistor can be performed similarly to that of the related art, thus achieving improvement in versatility.

Figure 7:
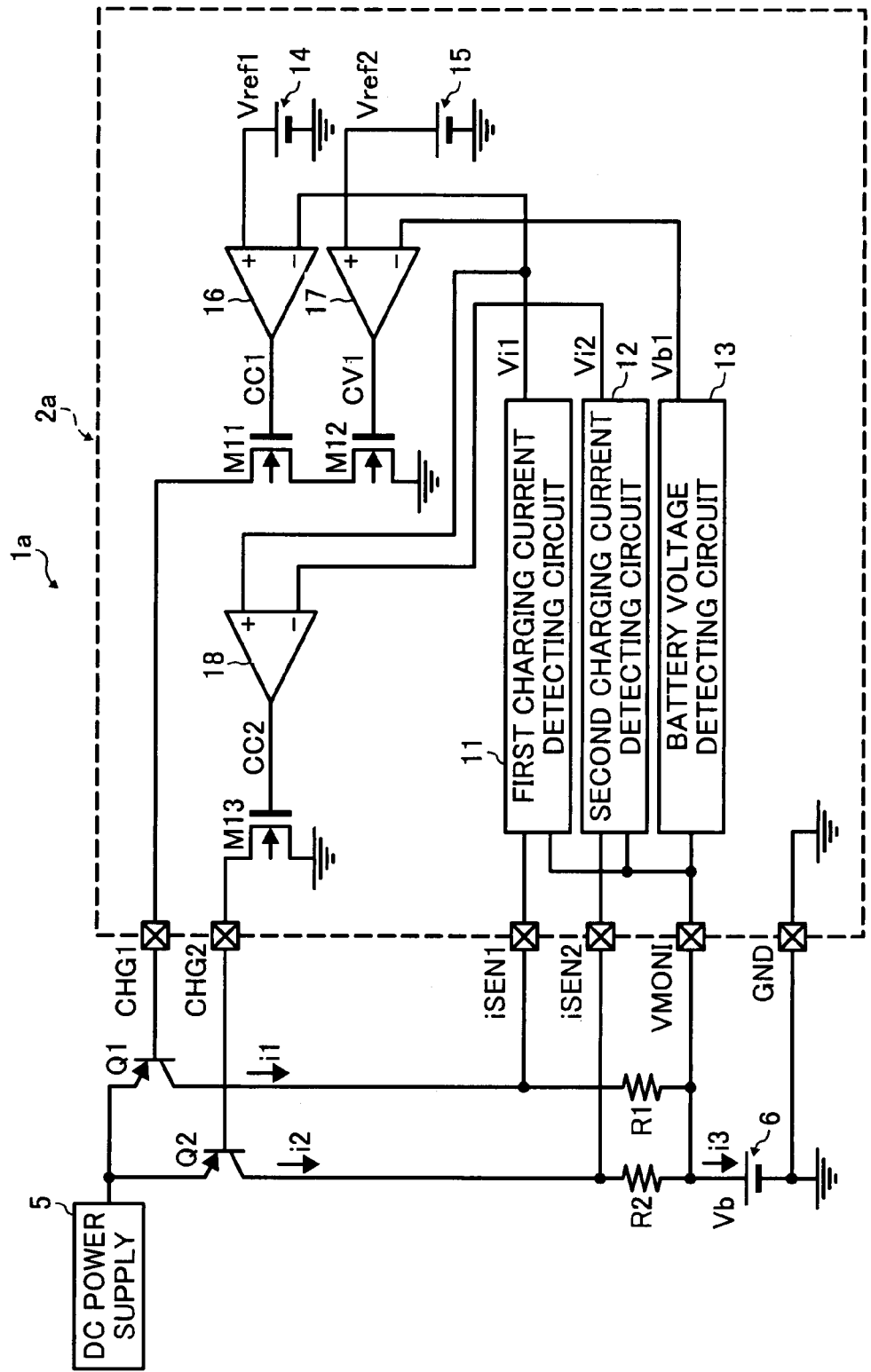
FIG. 7 is a circuit diagram illustrating a configuration of a secondary battery charging apparatus according to a second exemplary embodiment of the present patent specification.

Next, with referring to FIG. 7, a charging apparatus according to another exemplary embodiment of the present patent specification is described.

In the first exemplary embodiment, the collector currents i1 and i2 of the power transistors Q1 and Q2 may vary unless the NMOS transistors M12 and M14 have similar characteristics. Accordingly, for the power transistor Q2, the drain current i2 may be output so as to follow the drain current i1 form the power transistor Q1. A charging apparatus in which the drain current i2 is set in this manner is a second exemplary embodiment of the present patent specification.

FIG. 7 is a block diagram illustrating an example of the configuration of a secondary battery charging apparatus according to the second exemplary embodiment. In FIG. 7, portions identical or similar to those illustrated in FIG. 4 are denoted by identical reference numerals. Accordingly, the portions are not described and only differences from FIG. 4 are described below.

The charging apparatus in FIG. 7 differs from that in FIG. 4 in that it does not include the NMOS transistor 14 in FIG. 4 and that the signal Vi1 is input from the first charging current detecting circuit 11 to the non-inverting input terminal of the operational amplifier circuit 18 in FIG. 1. Accordingly, the charging control circuit 2 in FIG. 4 is changed to the charging control circuit 2a, and the charging apparatus 1 is changed to the charging apparatus 1a.

In FIG. 7, the charging apparatus 1a uses the DC power supply 5 as a power supply, and charges the secondary battery 6 by performing constant current charging or constant voltage charging.

The charging apparatus 1a includes the power transistors Q1 and Q2, the resistors R1 and R2, and the charging control circuit 2a, which controls operations of the power transistors Q1 and Q2 to charge the secondary battery 6 by constant current charging or constant voltage charging on the basis of battery voltage Vb as the voltage of the secondary battery 6, and pieces of current information of the first and second charging currents i1 and i2, the pieces being obtained from the voltage across the resistor R1 and the voltage across the resistor R2.

The charging control circuit 2a is integrated as a single IC. The charging control circuit 2a has terminals CHG1, CHG2, iSEN1, iSEN2, VMONI, and GND. The terminal GND is grounded. The charging control circuit 2a includes the first charging current detecting circuit 11, the second charging current detecting circuit 12, the battery voltage detecting circuit 13, the first reference voltage generating circuit 14, the second reference voltage generating circuit 15, the operational amplifier circuits 16 to 18, and the NMOS transistors M11 to M13.

The operational amplifier circuit 18 has a non-inverting terminal to which the signal Vi1 is input from the first charging current detecting circuit 11, and an inverting terminal to which the signal Vi2 is input from the second charging current detecting circuit 12. The NMOS transistor M13 is connected between terminal CHG2 and the ground. The charging control circuit 2a is included in the charging control semiconductor integrated circuit.

In this configuration, control of the operation of the power transistor Q1 is not described since it is similar to that in the case of FIG. 1.

The output signal Vi1 is input from the first charging current detecting circuit 11 to the non-inverting terminal of the operational amplifier circuit 18, and the output signal Vi2 is input from the second charging current detecting circuit 12 to the inverting terminal of the operational amplifier circuit 18. This causes the operational amplifier circuit 18 to control the collector current i2 of the power transistor Q2 through the NMOS transistor M13 so that the output signal Vi2 from the second charging current detecting circuit 12 is equal to the output signal Vi1 from the first charging current detecting circuit 11.

As described above, the charging apparatus according to the second exemplary embodiment can obtain advantages similar to those in the first exemplary embodiment. In addition, by setting the resistors R1 and R2 to have the same resistance, as illustrated in FIG. 6A, also in both a constant current charging region and a constant voltage charging region, the collector current i2 of the power transistor Q2 can be set to be accurately equal to the collector current i1 of the power transistor Q1. In addition, similarly to the charging apparatus 1 in FIG. 4, by setting the resistor R2 to be greater in resistance than the resistor R1, the collector current i2 of the power transistor Q2 can be decreased. Similarly to the case of FIG. 4, in a case in which the resistance of the resistor R2 is 1.5 times that of the resistor R1, the case is illustrated in the graph of FIG. 6B.

In the second exemplary embodiment, for the power transistor Q2 that only performs constant current charging, the value of the collector current i2 is changed in analog form. However, for the power transistor Q2 that only performs constant current charging, either operation of outputting a given constant current and stopping the outputting may be performed. Below, a charging apparatus that performs this operation is described as a third exemplary embodiment of the present patent specification.

Figure 8:
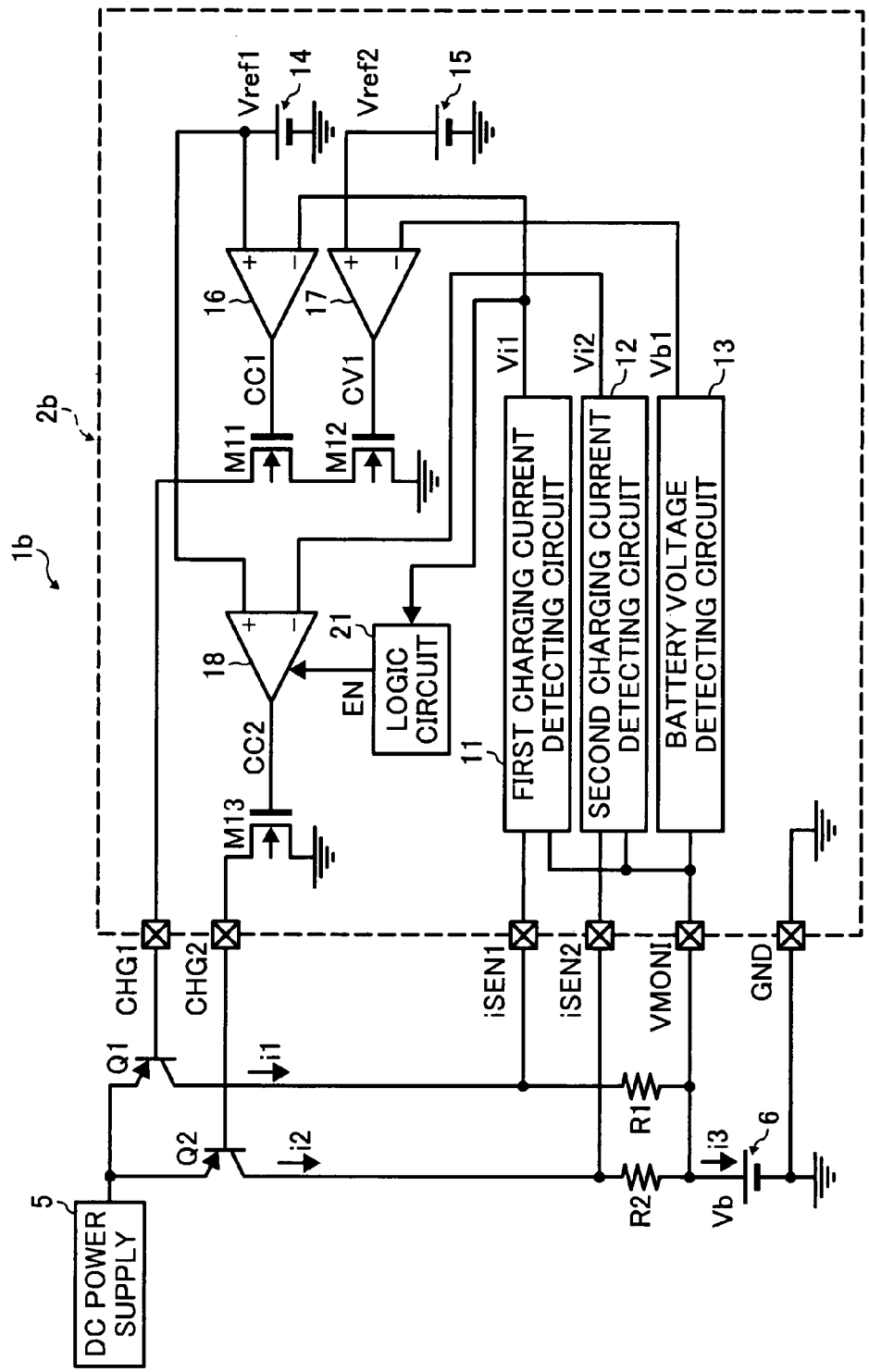
FIG. 8 is a circuit diagram illustrating a secondary battery charging apparatus according to a third exemplary embodiment of the present patent specification.

FIG. 8 is a block diagram illustrating a configuration of a secondary battery charging apparatus according to the third exemplary embodiment. In FIG. 8, portions identical or similar to those in FIG. 7 are denoted by identical reference numerals. Accordingly, the portions are not described, and only differences from FIG. 7 are described below.

The charging apparatus in FIG. 8 differs from that in FIG. 7 in that it additionally includes a logic circuit 21 that, when detecting, on the basis of the output signal Vi1 from the first charging current detecting circuit 11, a state in which the first charging current i1 is 0 A, stops the operation of the operational amplifier circuit 18 and turns off the NMOS transistor M13 so that the second charging current i2 is 0 A. Accordingly, the charging control circuit 2a in FIG. 7 is changed to a charging control circuit 2b, and the charging apparatus 1a in FIG. 7 is changed to a charging apparatus 1b.

In FIG. 8, the charging apparatus 1b uses the DC power supply 5 as a power supply to charge the secondary battery 6 by performing constant current charging or constant voltage charging.

The charging apparatus 1b includes the power transistors Q1 and Q2, the resistors R1 and R2, and a charging control circuit 2b that, on the basis of pieces of current information of the first and charging currents i1 and i2, the pieces being obtained from battery voltage Vb as the voltage of the secondary battery 6, the voltage across the resistor R1, and the voltage across the resistor R2, controls the operations of the power transistors Q1 and Q2 so that the secondary battery 6 is charged.

The charging control circuit 2b is integrated as a single integrated circuit, and has terminals CHG1, CHG2, iSEN1, iSEN2, VMONI, and GND. The terminal GND is grounded to have the ground voltage. The charging control circuit 2b includes the first charging current detecting circuit 11, the second charging current detecting circuit 12, the battery voltage detecting circuit 13, the first reference voltage generating circuit 14, the second reference voltage generating circuit 15, the operational amplifier circuits 16 to 18, the NMOS transistors M11 to M13, and the logic circuit 21.

First reference voltage Vref1 is input to the non-inverting terminal of the operational amplifier circuit 18, and the signal Vi2 is input from the second charging current detecting circuit 12 to the inverting terminal of the operational amplifier circuit 18. The signal Vi1 is input from the first charging current detecting circuit 11 to the logic circuit 21, and the logic circuit 21 controls the operation of the operational amplifier circuit 18 depending on whether the value of the first charging current i1, represented by the signal Vi1, is 0 A. The charging control circuit 2b is included in a charging control semiconductor integrated circuit, and the first reference voltage generating circuit 14, the operational amplifier circuit 18, the NMOS transistor M13, and the logic circuit 21 are included in a second constant current charging control circuit. The logic circuit 21 is included in the driving control circuit.

In this configuration, control of the operation of the power transistor Q1 is not described since it is similar to that in the case of FIG. 7.

Since the first reference voltage Vref1 is input to the non-inverting terminal of the operational amplifier circuit 18 and the output signal Vi2 is input from the second charging current detecting circuit 12 to the inverting terminal of the operational amplifier circuit 18, the operational amplifier circuit 18 performs constant current charging by using the NMOS transistor M13 to control the collector current i2 of the power transistor Q2 so that the output signal Vi2 from the second charging current detecting circuit 12 is equal to the first reference voltage Vref1.

When the first charging current i1 represented by the signal Vi1 from the first charging current detecting circuit 11 exceeds 0 A, the logic circuit 21 allows the operational amplifier circuit 18 to operate by asserting an enable signal EN to the operational amplifier circuit 18. When the current value of the signal Vi1 from the first charging current detecting circuit 11 is equal to or less than 0 A, the logic circuit 21 stops the operation of the operational amplifier circuit 18 by negating the enable signal EN. Stop of the operation of the operational amplifier circuit 18 causes the collector current i2 of the power transistor Q2 to be 0 A.

Figure 9A:
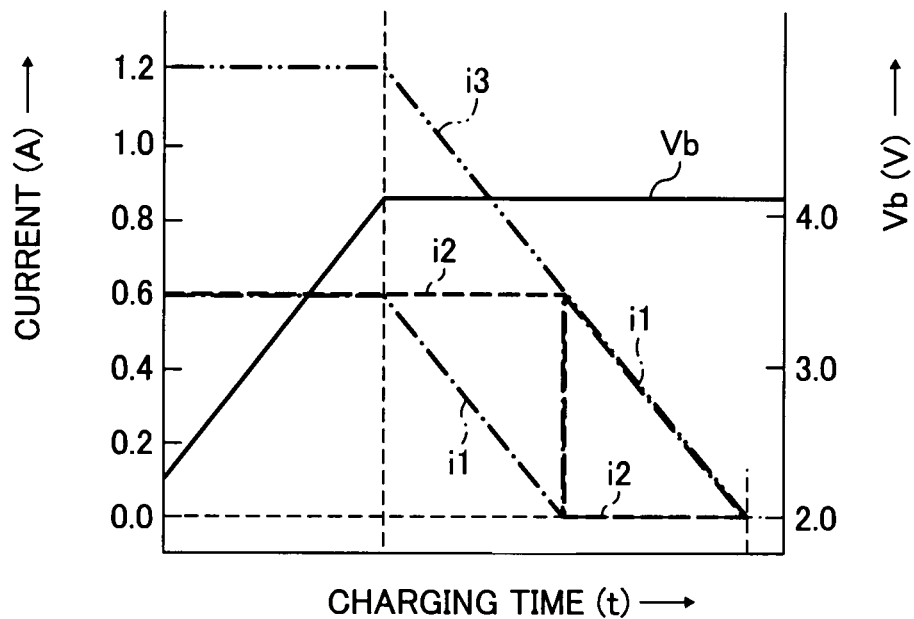
FIGS. 9A and 9B are graphs illustrating relationships between battery voltage Vb and charging current i3 in the charging apparatus illustrated in FIG. 8.
Figure 9B:
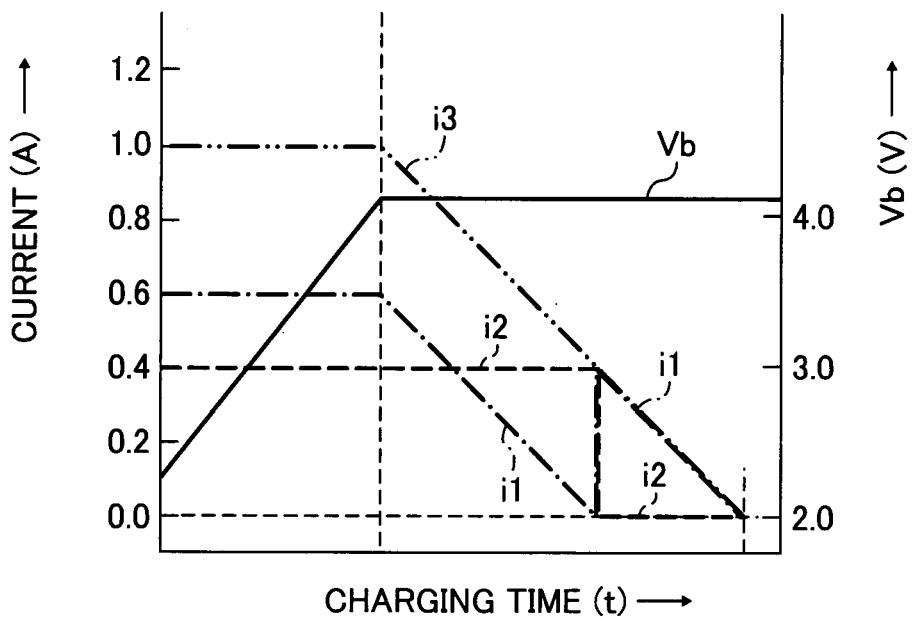

FIGS. 9A and 9B are graphs illustrating examples of relationships between battery voltage Vb and charging current i3 in the charging apparatus 1b illustrated in FIG. 8.

FIG. 9A illustrates a case in which the charging current i3 in constant current charging is 1.2 A and the resistances of the resistors R1 and R2 are equal.

As illustrated in FIG. 9A, when the battery voltage Vb of the secondary battery 6 reaches 4.2 V (volts), the power transistor Q1 charges the secondary battery 6 by constant voltage charging. Although the collector current i1 gradually decreases, the collector current i2 of the power transistor Q2 is constant since the power transistor Q2 continuously charges the secondary battery 6 by constant current charging.

When the collector current i1 of the power transistor Q1 has a value of 0 A, the logic circuit 21 stops the operational amplifier circuit 18, so that the collector current i2 of the power transistor Q2 has a value of 0 A. At this time, the circuit that controls the operation of the power transistor Q1 sets the collector current i1 of the power transistor Q1 to have a current value equal to that of the second charging current i2 in constant current charging performed by the power transistor Q2, and subsequently uses the power transistor Q1 to perform constant voltage charging.

In the case illustrated in FIG. 9A, the resistors R1 and R2 have equal resistances, and both the collector current i1 of the power transistor Q1 and the collector current i2 of the power transistor Q2 have current values of 0.6 A. Even after the charging is changed to constant voltage charging, until the collector current i1 of the power transistor Q1 has a current value of 0 A, the collector current i2 of the power transistor Q2 maintains to have 0.6 A.

When the collector current i1 of the power transistor Q1 has 0 A, the enable signal EN from the logic circuit 21 is negated. Thus, the collector current i2 of the power transistor Q2 is 0 A. At this time, the circuit that controls the operation of the power transistor Q1 performs constant voltage charging from 0.6 A as the collector current i2 of the power transistor Q1.

Next, the graph in FIG. 9B illustrates a case in which the resistance of the resistor R2 is set to be 1.5 times that of the resistor R1. In a constant current charging period, the collector current i2 of the power transistor Q2 is 0.4 A, which is ⅔ of the collector current i1 of the power transistor Q1, so that this current value does not change even after the charging is changed to constant voltage charging. However, when the collector current i1 of the power transistor Q1 has a value of 0 A, the logic circuit 21 operates to stop the operation of the operational amplifier circuit 18, whereby the collector current i2 of the power transistor Q2 has a value of 0 A. At this time, the circuit that controls the operation of the power transistor Q1 restarts the constant voltage charging from 0.4 A as the collector current i1 of the power transistor Q1, which is equal to the collector current i2 of the power transistor Q2.

As described above, the charging apparatus according to the third exemplary embodiment can obtain advantages similar to those of the second exemplary embodiment. In this charging apparatus, constant current charging by the power transistor Q2 can be performed in digital form, circuit operation simplification can be achieved, and design efficiency can be improved. Thus, cost reduction can be achieved.

In constant voltage charging, in order to detect the first charging current i1 of the secondary battery 6, the second charging current i2 may be stopped faster than the first charging current i1. Below, a charging apparatus operating in this manner is described as a fourth exemplary embodiment of the present patent specification.

Figure 10:
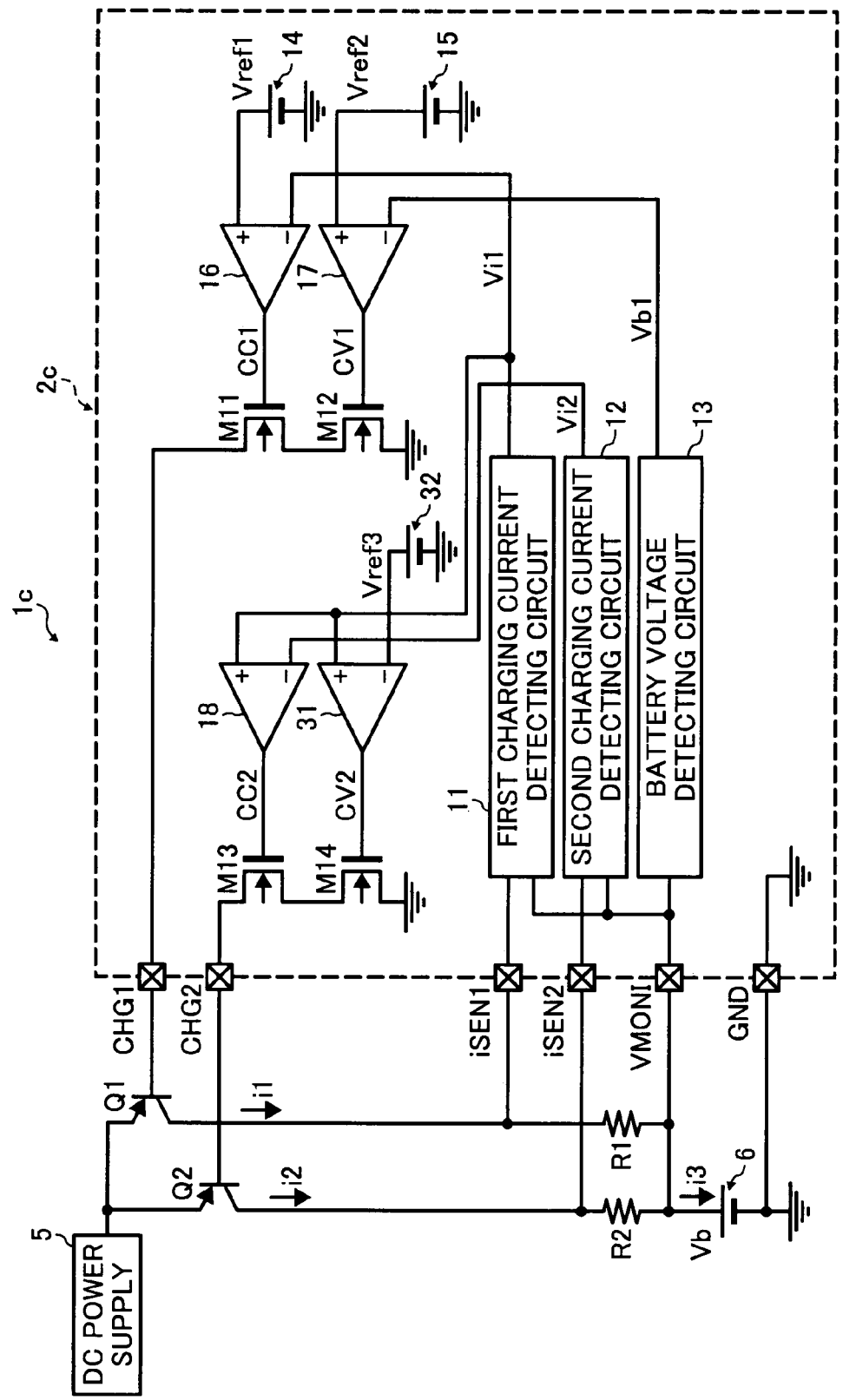
FIG. 10 is a circuit diagram illustrating a secondary battery charging apparatus according to a fourth exemplary embodiment of the present patent specification.

FIG. 10 is a block diagram illustrating a configuration of a secondary battery charging apparatus according to the fourth exemplary embodiment. In FIG. 10, portions identical or similar to those in FIG. 4 are denoted by identical reference numerals. Accordingly, the portions are not described, only differences from FIG. 4 are described below.

The charging apparatus in FIG. 10 differs from that in FIG. 4 in that it additionally includes an operational amplifier circuit 31 and a third reference voltage generating circuit 32 for generating and outputting a third reference voltage Vref3. Accordingly, the charging control circuit 2 in FIG. 4 is changed to a charging control circuit 2c and the charging apparatus 1 in FIG. 4 is changed to a charging apparatus 1c.

In FIG. 10, the charging apparatus 1c uses the DC power supply 5 as a power supply to charge the secondary battery 6 by constant current charging or constant voltage charging.

The charging apparatus 1c includes the power transistors Q1 and Q2, the resistors R1 and R2, and the charging control circuit 2c, which controls, on the basis of pieces of current value information of the first and second charging current i1 and i2, the pieces being obtained from the battery voltage Vb as the voltage of the secondary battery 6, the voltage across the resistor R1, and the voltage across the resistor R2, operations of the power transistors Q1 and Q2 so that the secondary battery 6 is charged by constant current charging or constant voltage charging.

The charging control circuit 2c is integrated as a single integrated circuit. The charging control circuit 2c has terminals CHG1, CHG2, iSEN1, iSEN2, VMONI, and GND. The terminal GND is grounded. The charging control circuit 2c includes the first charging current detecting circuit 11, the second charging current detecting circuit 12, the battery voltage detecting circuit 13, the first reference voltage generating circuit 14, the second reference voltage generating circuit 15, the third reference voltage generating circuit 32, the operational amplifier circuits 16 to 18, and 31, and the NMOS transistors M11 to M14.

The operational amplifier circuit 18 has a non-inverting terminal to which the signal Vi1 is input from the first charging current detecting circuit 11, and an inverting terminal to which the signal Vi2 is input from the second charging current detecting circuit 12. For this reason, the operational amplifier circuit 18 controls the collector current i2 of the power transistor Q2 so that the output signal Vi2 from the second charging current detecting circuit 12 is equal to the output signal Vi1 from the first charging current detecting circuit 11. In addition, the operational amplifier circuit 31 has a non-inverting terminal to which the signal Vi1 is input from the first charging current detecting circuit 11, and an inverting terminal to which the third reference voltage Vref3 is input. An output terminal of the operational amplifier circuit 31 is connected to a gate of the NMOS transistor M14. The charging control circuit 2c is included in a charging control semiconductor integrated circuit. The third reference voltage generating circuit 32, the operational amplifier circuits 18 and 31, the NMOS transistors M13 and M14 are included in a second charging circuit portion. The operational amplifier circuit 18 and the NMOS transistor M13 are included in a second constant current charging circuit. The third reference voltage generating circuit 32, the operational amplifier circuit 31, and the NMOS transistor M14 are included in the second constant current charging circuit. The operational amplifier circuit 31 is included in a fourth operational amplifier circuit.

In this configuration, control of the operation of the power transistor Q1 is similar to that in FIG. 1.

When the output signal Vi1 from the first charging current detecting circuit 11 is greater than the third reference voltage Vref3, the output signal CV2 from the operational amplifier circuit 31 is in a high level, so that the NMOS transistor M14 is turned on. In addition, the operational amplifier circuit 18 controls the collector current i2 of the power transistor Q2 by using the NMOS transistor M13 so that the output signal Vi2 from the second charging current detecting circuit 12 is equal to the output signal Vi1 from the first charging current detecting circuit 11.

In constant voltage charging, when the output signal Vi1 from the first charging current detecting circuit 11 decreases to the third reference voltage Vref3, the operational amplifier circuit 18 controls the collector current i2 of the power transistor Q2 so that the output signal Vi1 from the first charging current detecting circuit 11 is equal to the third reference voltage Vref3. Thus, only the collector current i2 from the power transistor Q2 decreases.

In addition, when the collector current i2 from the power transistor Q2 reaches 0 A, the circuit that controls the operation of the power transistor Q1 controls the operation of the power transistor Q1 so that constant voltage charging is performed. For this reason, the circuit that controls the operation of the power transistor Q1 performs constant voltage charging so that the output signal Vb1 from the battery voltage detecting circuit 13 is equal to the second reference voltage Vref2. Thus, the collector current i1 from the power transistor Q1 begins to decrease.

Figure 11A:
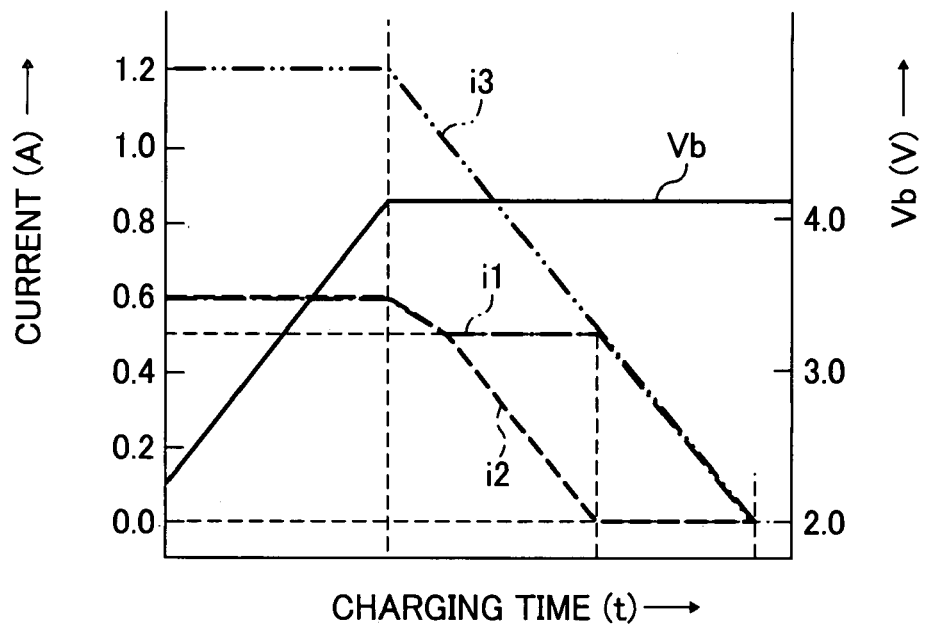
FIGS. 11A and 11B are graphs illustrating relationships between battery voltage Vb and charging current i3 in the charging apparatus illustrated in FIG. 10.
Figure 11B:
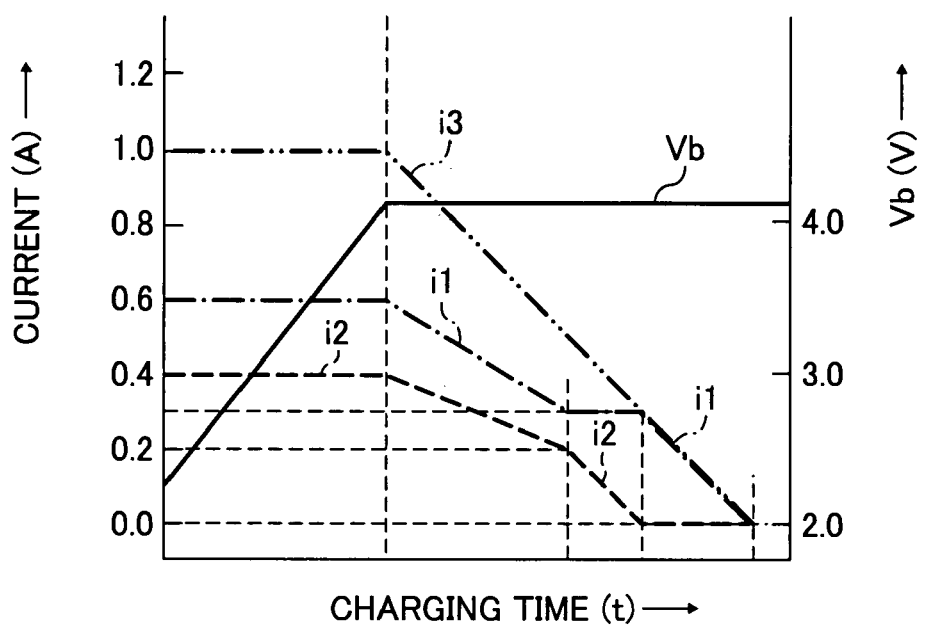

FIGS. 11A and 11B are graphs illustrating examples of relationships between the battery voltage Vb and charging current i3 in the charging apparatus 1c illustrated in FIG. 10.

FIG. 11A illustrates a state in which the charging current i3 in constant voltage charging is 1.2 A, and the resistors R1 and R2 are equal in resistance, and illustrates a case in which the output signal Vi1 from the first charging current detecting circuit 11 is set to be equal to the third reference voltage Vref3 when the collector current i1 of the power transistor Q1 decreases.

When the collector current i1 of the power transistor Q1 is not less than 0.5 A, the collector current i2 of the power transistor Q2 is equal to the collector current i1 of the power transistor Q1. After that, constant voltage charging is performed by gradually decreasing the collector current i2 of the power transistor Q2 so that the collector current i1 of the power transistor Q1 is maintained to be 0.5 A. When the collector current i2 of the power transistor Q2 is 0 A, only the circuit that controls the operation of the power transistor Q1 continuously performs the constant voltage charging. Thus, the collector current i1 of the power transistor Q1 gradually decreases.

FIG. 11B illustrates a case in which the resistance of the resistor R2 is set to be 1.5 times that of the resistor R1, and the output signal Vi1 of the first charging current detecting circuit 11 is set to be equal to the third reference voltage Ver3 when the collector current i1 of the power transistor Q1 is 0.3 A.

When the collector current i1 of the power transistor Q1 is not less than 0.3 A, the collector current i2 of the power transistor Q2 is ⅔ of the collector current i2 of the power transistor Q1. After that, constant voltage charging is performed by gradually decreasing the collector current i2 of the power transistor Q2 so that the collector current i1 of the power transistor Q1 is maintained to be 0.3 A. When the collector current i2 of the power transistor Q2 is 0 A, only the circuit that controls the operation of the power transistor Q1. Thus, the collector current i1 of the power transistor Q1 decreases.

As described above, the charging apparatus according to the fourth exemplary embodiment can provide advantages similar to those according to the first exemplary embodiment. In addition, in constant voltage charging, the second charging current i2 can be decreased faster than the first charging current i1. Thus, completion of charging of the secondary battery 6 can be detected only from the first charging current i1, thus accurately detecting completion of charging of the secondary battery 6.

Figure 12:
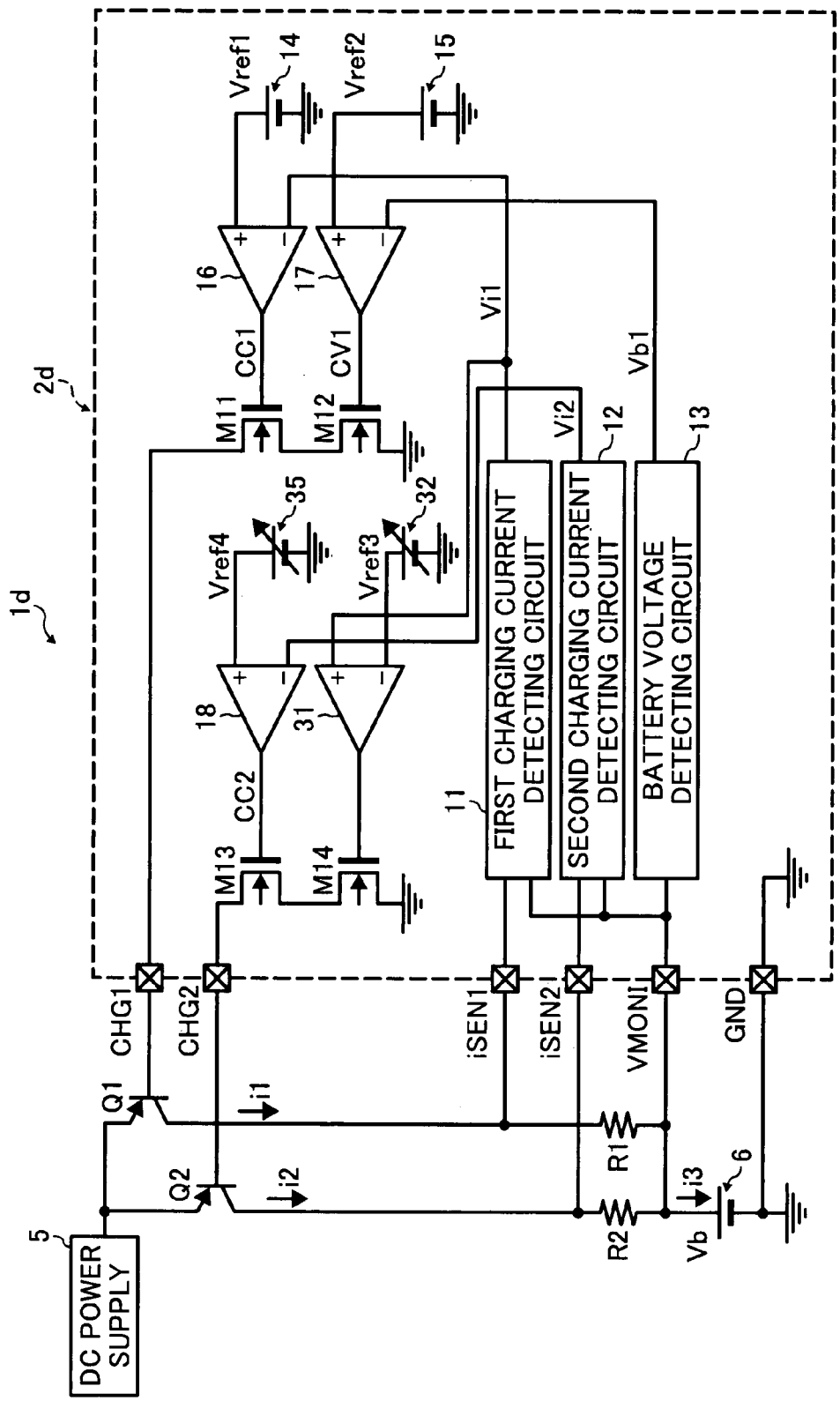
FIG. 12 is a circuit diagram illustrating a secondary battery charging apparatus according to a fifth exemplary embodiment of the present patent specification.

FIG. 12 is a block diagram illustrating a configuration of a secondary battery charging apparatus according to a fifth exemplary embodiment of the present patent specification. In FIG. 12, portions identical or similar to those in FIG. 10 are denoted by identical reference numerals. Accordingly, the portions are not described, and only differences from FIG. 10 are described below.

The charging apparatus in FIG. 12 differs from that in FIG. 10 in that it additionally includes a fourth reference voltage generating circuit 35 for generating and outputting a given fourth reference voltage Vref4, and that the fourth reference voltage Vref4 is input to a non-inverting terminal of the operational amplifier circuit 18. Accordingly, the charging control circuit 2c in FIG. 10 is changed to a charging control circuit 2d, and the charging apparatus 1c in FIG. 10 is changed to a charging apparatus 1d.

In FIG. 12, the charging apparatus 1d uses the DC power supply 5 as a power supply to charge the secondary battery 6 by constant current charging or constant voltage charging.

The charging apparatus 1d includes the power transistors Q1 and Q2, the resistors R1 and R2, and the charging control circuit 2d, which controls, on the basis of pieces of current value information of the first and second charging currents i1 and i2, the pieces being obtained from the battery voltage Vb as the voltage of the secondary battery 6, the voltage across the resistor R1, and the voltage across the resistor R2, operations of the power transistors Q1 and Q2 so that the secondary battery 6 is charged by constant current charging or constant voltage charging.

The charging control circuit 2d is integrated as a single integrated circuit. The charging control circuit 2d has terminals CHG1, CHG2, iSEN1, iSEN2, VMONI, and GND. The terminal GND is grounded. The charging control circuit 2d includes the first charging current detecting circuit 11, the second charging current detecting circuit 12, the battery voltage detecting circuit 13, the first reference voltage generating circuit 14, the second reference voltage generating circuit 15, the third reference voltage generating circuit 32, the fourth reference voltage generating circuit 35, the operational amplifier circuits 16 to 18, and 31, and the NMOS transistors M11 to M14.

The charging control circuit 2d is included in a charging control semiconductor integrated circuit. The third reference voltage generating circuit 32, the fourth reference voltage generating circuit 35, the operational amplifier circuits 18 and 31, and the NMOS transistors M13 and M14 are included in the second charging-control circuit portion. The fourth reference voltage generating circuit 35, the operational amplifier circuit 18, and the NMOS transistor M13 are included in the second constant current charging control circuit. The third reference voltage generating circuit 32, the operational amplifier circuit 31, and the NMOS transistor M14 are included in the second constant-voltage-charging control circuit.

The operational amplifier circuit 18 has a non-inverting terminal to which the fourth reference voltage Vref4 is input, and an inverting terminal to which the signal Vi2 is input from the second charging current detecting circuit 12. For this reason, the operational amplifier circuit 18 controls the collector current i2 of the power transistor Q2 so that the output signal Vi2 from the second charging current detecting circuit 12 is equal to the fourth reference voltage Vref4.

In this configuration, control of the operation of the power transistor Q1 is similar to that in FIG. 1. Accordingly, the control is not described.

The operational amplifier circuit 31 has an inverting terminal to which the third reference voltage Ver3 is input, and a non-inverting terminal to which the output signal Vi1 is input from the first charging current detecting circuit 11. The voltage of the third reference voltage Vref3 is set to be less than the output signal Vi1 from the first charging current detecting circuit 11.

When the output signal Vi1 from the first charging current detecting circuit 11 is greater than the third reference voltage Vref3, the operational amplifier circuit 31 turns on the NMOS transistor M14 by outputting a high level signal. In this state, in order for the operational amplifier circuit 18 to control the collector current i2 of the power transistor Q2 so that the output signal Vi2 from the second charging current detecting circuit 12 is equal to the fourth reference voltage Vref4, the collector current i2 of the power transistor Q2 becomes constant.

Next, when the output signal Vi1 from the first charging current detecting circuit 11 decreases to the fourth reference voltage Vref4, in order for the operational amplifier circuit 31 to control the power transistor Q2 with the NMOS transistor M14 so that the output signal Vi1 from the first charging current detecting circuit 11 is equal to the third reference voltage Vref3, the collector current i2 of the power transistor Q2 decreases. While the collector current i2 of the power transistor Q2 is decreasing, the collector current i1 of the power transistor Q1 becomes a constant current determined by the third reference voltage Vref3.

In addition, when the collector current i2 of the power transistor Q2 is 0 A, under constant voltage charging control by the circuit that controls the operation of the power transistor Q1, constant voltage charging is performed by controlling the collector current i1 of the power transistor Q1 so that the output signal Vb1 from the battery voltage detecting circuit 13 is equal to the second reference voltage Vref2.

Figure 13A:
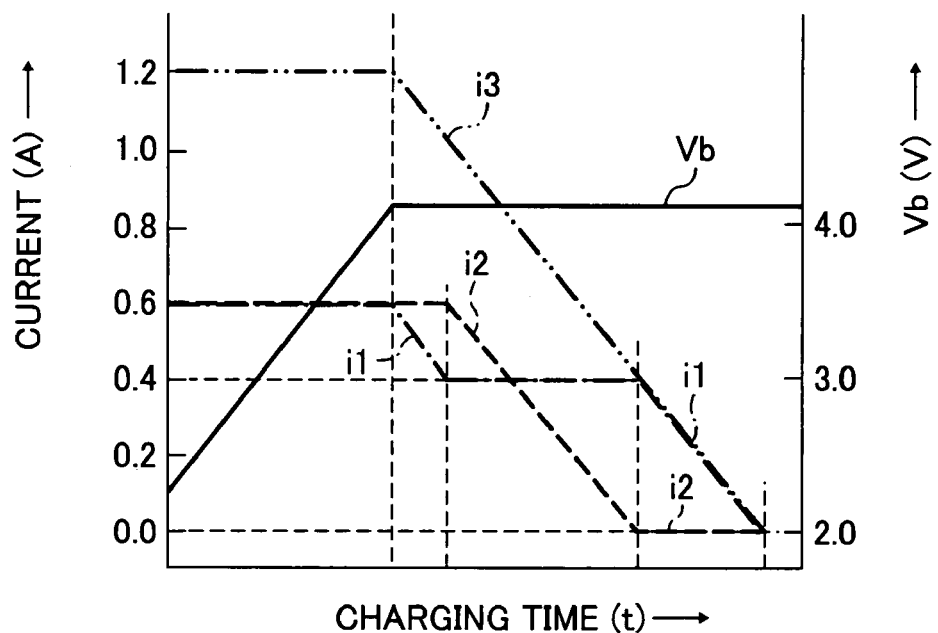
FIGS. 13A and 13B are graphs illustrating relationships between battery voltage Vb and charging current i3 in the charging apparatus illustrated in FIG. 12.
Figure 13B:
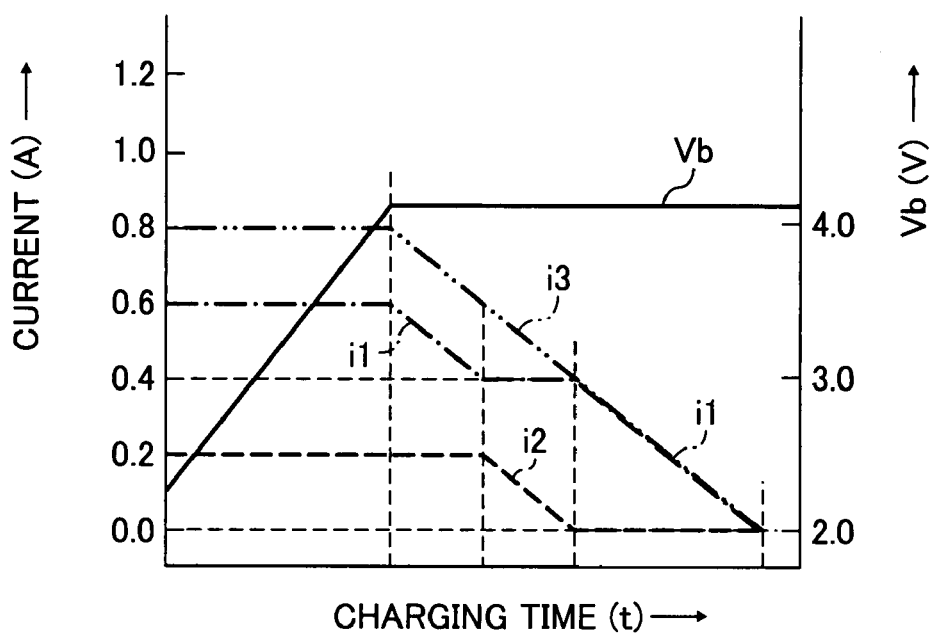

FIGS. 13A and 13B are graphs illustrating examples of relationships between the battery voltage Vb and charging current i3 in the charging apparatus 1d in FIG. 12.

FIG. 13A illustrates a case in which, by setting the reference voltage Vref1 and the fourth reference voltage Vref4 to be equal, the charging current i3 in constant voltage charging is set to 1.2 A, the collector currents i1 and i2 of the power transistors Q1 and Q2 are set to 0.6 A, and the third reference voltage Vref3 is set to be equal to the output signal Vi1 from the first charging current detecting circuit 11 when the collector current i1 of the power transistor Q1 is 0.4 A.

When the battery voltage Vb is less than 4.2 V, the collector currents i1 and i2 of the power transistors Q1 and Q2 are both 0.6 A, so that constant voltage charging is performed.

When the battery voltage Vb is 4.2 V, the charging is changed to constant voltage charging. To maintain the battery voltage Vb to be constant, first, the collector current i1 of the power transistor Q1 decreases. When the collector current i1 of the power transistor Q1 decreases to 0.4 A at which the output signal Vi1 from the first charging current detecting circuit 11 becomes equal to the third reference voltage Vref3, the collector current i2 of the power transistor Q1 begins to decrease, and the collector current i1 of the power transistor Q1 becomes constant at 0.4 A. When the collector current i2 of the power transistor Q2 is 0 A, the collector current i1 of the power transistor Q1 begins to decrease again.

Next, the FIG. 13B illustrates a case in which the fourth reference voltage Vref4 is set to be equal to the output signal Vi2 from the second charging current detecting circuit 12 when the collector current i2 of the power transistor Q2 is 0.2 A, in which the charging current in constant current charging is set to 0.8 A, the collector current i1 of the power transistor Q1 is set to 0.6 A, and the collector current i1 of the power transistor Q1 is set to 0.2 A, and in which the third reference voltage Vref3 is set to be equal to the output signal Vi1 from the first charging current detecting circuit 11 when the collector current i1 of the power transistor Q1 is 0.4 A.

When the battery voltage Vb is less than 4.2 V, the collector current i1 of the power transistor Q1 is 0.6 A and the collector current i2 of the power transistor Q2 is 0.2 A, and each power transistor performs constant current charging. When the battery voltage Vb is 4.2 V, the charging is changed to constant voltage charging, and, in order to maintain the battery voltage Vb to be constant, at first, the collector current i1 of the power transistor Q1 decreases. When the collector current i1 of the power transistor Q1 decreases to 0.4 A at which the output signal Vi1 from the first charging current detecting circuit 11 becomes equal to the third reference voltage Vref3, the collector current i2 of the power transistor Q2 begins to decrease, and the collector current i1 of the power transistor Q1 becomes unchanged to be constant at 0.4 A. When the collector current i2 of the power transistor Q2 is 0 A, the collector current i1 of the power transistor Q1 begins to decrease again.

As described above, the charging apparatus according to the fifth exemplary embodiment can obtain advantages similar to those in the fourth exemplary embodiment. In addition, by variably changing the third reference voltage Vref3 and the fourth reference voltage Vref4, the maximum of the collector current i2 of the power transistor Q1, and the value of the collector current i2 of the power transistor Q1 can freely be set.

In the first to fifth exemplary embodiments, cases in which PNP transistors are used as charging power transistors have been described as examples. However, the exemplary embodiments of the present patent specification is not limited to the first to fifth exemplary embodiments, but the PNP transistors may be replaced by PMOS transistors. In addition, NPN transistors and NMOS transistors may be used as power transistors for charging.

The above-described exemplary embodiments may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The subject matter of this disclosure may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein. For example, elements and/or features of different examples and illustrative embodiments may be combined with each other and/or substituted for each other within the scope of this disclosure and appended claims.

This patent specification is based on Japanese patent application, No. JP2006-040867 filed on Feb. 17, 2006 in the Japan Patent Office, the entire contents of which are incorporated by reference herein.

What is claimed is:

1. A charging control semiconductor integrated circuit for a charging apparatus that performs one of constant current charging and constant voltage charging to charge a secondary battery by supplying charging currents from first and second charging transistors to the secondary battery through first and second charging current detecting resistors, respectively, the charging control semiconductor integrated circuit comprising:

a first terminal to output a first control signal to the first charging transistor; and a second terminal to output a second control signal to the second charging transistor, wherein the first and second charging transistors are separately controlled on the basis of a voltage across the first charging transistor, a voltage across the second charging transistor, and a voltage of the secondary battery.

2. The charging control semiconductor integrated circuit according to claim 1, further comprising:

a first charging-current-detecting circuit section configured to detect a first value of a first charging current from the first charging transistor on the basis of the voltage across the first charging current detecting resistor, and generate and output a first charging current value signal representing the detected first value of the first charging current;

a second charging-current-detecting circuit section configured to detect a second value of a second charging current from the second charging transistor on the basis of the voltage across the second charging current detecting resistor, and generate and output a second charging current value signal representing the detected second value of the second charging current;

a battery-voltage-detecting circuit section configured to detect a battery voltage as the voltage of the secondary battery, and generate and output a detected battery voltage signal representing the detected battery voltage;

a first charging-control circuit section configured to perform, on the basis of the first charging current value signal from the first charging-current-detecting circuit section and the detected battery voltage signal from the battery-voltage-detecting circuit section, one of (i) constant current charging allowing the first charging transistor to output a given first charging current, or (ii) constant voltage charging allowing the first charging transistor to output the first charging current so that the battery voltage is constant at a given value; and a second charging-control circuit section configured to perform, on the basis of the second charging current value signal from the second charging-current-detecting circuit section and the detected battery voltage signal from the battery-voltage-detecting circuit section, one of (i) constant current charging allowing the second charging transistor to output a given second charging current, or (ii) constant voltage charging allowing the second charging transistor to output the second charging current so that the battery voltage is constant at a given value.

3. The charging control semiconductor according to claim 2, wherein the first charging-control circuit section includes:
a first constant-current-charging control circuit configured to control, on the basis of the first charging current value signal from the first charging-current-detecting circuit section, the first charging transistor to output the first charging current; and
a first constant-voltage-charging control circuit configured to control, on the basis of the detected battery voltage signal from the battery-voltage-detecting circuit section, the first charging transistor to output the first charging current so that the battery voltage is constant at a given value.

4. The charging control semiconductor integrated circuit according to claim 3,
wherein the first constant-current-charging control circuit includes:
a first operational amplifier circuit configured to amplify a difference voltage between the first charging current value signal from the first charging current detecting control circuit section and a given first reference voltage, and output the amplified difference voltage as a first amplified difference voltage signal; and
a first transistor having a first control electrode, the first amplified difference voltage signal from the first operational amplifier circuit being input through said first control electrode; and
the first constant-voltage-charging control circuit includes:
a second operational amplifier circuit configured to amplify a difference voltage between the detected battery voltage signal from the battery-voltage-detecting circuit section and a given second reference voltage, and output the amplified difference voltage as a second amplified difference voltage signal; and
a second transistor having a second control electrode, the second amplified difference voltage signal from the second operational amplifier circuit being input through said second control electrode; and
wherein the first and second transistors are connected in series between the first control electrode of the first charging transistor and a portion having a given voltage.

5. The charging control semiconductor integrated circuit according to claim 2, wherein the second charging current generated and output by the second charging-control circuit section is proportional to the first charging current.

6. The charging control semiconductor integrated circuit according to claim 4, wherein the second charging-control circuit section includes:
a second constant-current-charging control circuit configured to control, on the basis of the second charging current value second charging current value signal from the second charging-current-detecting circuit section, the second charging transistor to output the second charging current; and
a second constant-voltage-charging control circuit configured to control, on the basis of the detected battery voltage signal from the battery-voltage-detecting circuit section, the second charging transistor to output the second charging current so that the battery voltage is constant at a given value.

7. The charging control semiconductor integrated circuit according to claim 6,
wherein the second constant-current-charging control circuit includes:
a third operational amplifier circuit configured to amplify a difference voltage between the detected battery voltage second charging current value signal from the second charging-current-detecting circuit section and the first reference voltage, and output the amplified difference voltage as a third amplified difference voltage signal; and
a third transistor having a third control electrode to which the third amplified difference voltage signal from the third operational amplifier circuit is input;
wherein the second constant-voltage-charging control circuit includes a fourth transistor having a fourth control electrode to which the first amplified difference voltage signal from the first operational amplifier circuit is input; and
wherein the third and fourth transistors are connected in series between the second control electrode of the second charging transistor and a portion having a given voltage.

8. The charging control semiconductor integrated circuit according to claim 4, wherein the second charging-control circuit section includes a second constant-current-charging control circuit configured to control, on the basis of the second charging current value signal from the second charging-current-detecting circuit section, the second charging transistor to output the second charging current.

9. The charging control semiconductor integrated circuit according to claim 8,
wherein the second constant-current-charging control circuit includes:
a third operational amplifier circuit configured to amplify a difference voltage between the first charging current value signal from the first charging-current-detecting circuit section and the second charging current value signal from the second charging-current-detecting circuit section, and output the amplified difference voltage as a third amplified difference voltage signal; and
a third transistor having a third control electrode to which the third amplified difference voltage signal from the third operational amplifier circuit is input; and
wherein the third transistor is connected between the second control electrode of the second charging transistor and a portion having a given voltage.

10. The charging control semiconductor integrated circuit according to claim 2, wherein the second charging control circuit includes a second constant current charging control circuit configured to control, on the basis of the second charging current value signal from the second charging-current-detecting circuit section, the second charging transistor to output the second charging current.

11. The charging control semiconductor integrated circuit according to claim 1, wherein the second constant-current-charging control circuit includes:
a third operational amplifier circuit configured to amplify a difference voltage between the second charging current value signal from the second charging-current-detecting circuit section, and output the amplified difference voltage as a third amplified difference voltage signal;
a third transistor having a third control electrode to which the third amplified difference voltage signal from the third operational amplifier circuit is input; and
a driving control circuit configured to control driving of the third operational amplifier circuit depending on the first charging current value signal from the first charging-current-detecting circuit section, and wherein the third transistor is connected between the second control electrode of the second charging transistor and a portion having a given voltage, and the third transistor turns off the second transistor to place the second transistor in a shutoff state by stopping an operation of the third operational amplifier circuit when the first charging current is not greater than a given value.

12. The charging control semiconductor integrated circuit according to claim 2, wherein the second charging-current-detecting circuit section includes:

a second constant-current-charging control circuit configured to control, on the basis of the first and second charging current value signals from the first and second charging-current-detecting circuit sections, respectively, the second charging transistor to output the second charging current so that the battery voltage is constant at a given value; and a second constant-voltage-charging control circuit configured to control, on the basis of the first charging current value signal from the first charging-current-detecting circuit section, the second charging transistor to output the second charging current so that the battery voltage is constant at a given value.

13. The charging control semiconductor integrated circuit according to claim 12, wherein the second constant-current-charging control circuit includes:

a third operational amplifier circuit configured to amplify a difference voltage between the first and second charging current value signals from the first and second charging-current-detecting circuit sections, respectively, and output the amplified difference voltage as a third amplified difference voltage signal; and a third transistor having a third control electrode to which the third amplified difference voltage signal from the third operational amplifier circuit is input; and wherein the second constant-voltage-charging control circuit includes:

a fourth operational amplifier circuit configured to amplify a difference voltage between the first and second charging current value signals from the first and second charging-current-detecting circuit sections, respectively, and output the amplified difference voltage as a fourth amplified difference voltage signal; and a fourth transistor having a fourth control electrode to which the fourth amplified difference voltage signal from the fourth operational amplifier circuit is input; and wherein the third and fourth transistors are connected in series between the second control electrode of the second charging transistor and a portion having a given voltage.

14. The charging control semiconductor integrated circuit according to claim 2, wherein the second charging-control circuit section includes:

a second constant-current-charging control circuit configured to control, on the basis of the second charging current value signal from the second charging-current-detecting circuit section, the second charging transistor to output the second charging current so that the battery voltage is constant at a given value; and a second constant-voltage-charging control circuit configured to control, on the basis of the first charging current value signal from the first charging-current-detecting circuit section, the second charging transistor to output the second charging current so that the battery voltage is constant at a given value.

15. The charging control semiconductor integrated circuit according to claim 14, wherein the second constant-current-charging control circuit includes:

a third operational amplifier circuit configured to amplify a difference voltage between the second charging current value signal from the second charging-current-detecting circuit section and a given fourth reference voltage, and output the amplified difference voltage as a third amplified difference voltage signal; and a third transistor having a third control electrode to which the third amplified difference voltage signal from the third operational amplifier circuit is input;

wherein the second constant-current-charging control circuit includes:

a fourth operational amplifier circuit configured to amplify a difference voltage between the first charging current value signal from the first charging-current-detecting circuit section and a given third reference voltage, and output the amplified difference voltage as a fourth amplified difference voltage signal; and a fourth transistor having a fourth control electrode to which the fourth amplified difference voltage signal from the fourth operational amplifier circuit is input; and wherein the third and fourth transistors are connected in series between the second control electrode of the second charging transistor and a portion having a given voltage.

16. The charging control semiconductor integrated circuit according to claim 15, wherein the third and fourth reference voltages are capable of being changed.

* * * * *